(12) United States Patent
Griffing et al.

(10) Patent No.: US 11,740,380 B2
(45) Date of Patent: Aug. 29, 2023

(54) MINIMAL ELECTRONIC SENSOR COLLARS

(71) Applicant: Halliburton Energy Services, Inc., Houston, TX (US)

(72) Inventors: Matthew Chase Griffing, Kingwood, TX (US); Clint Paul Lozinsky, Kingwood, TX (US); Michael Bittar, Houston, TX (US); Hsu-Hsiang Wu, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 457 days.

(21) Appl. No.: 16/911,653

(22) Filed: Jun. 25, 2020

(65) Prior Publication Data
US 2021/0349231 A1 Nov. 11, 2021

Related U.S. Application Data

(60) Provisional application No. 63/022,058, filed on May 8, 2020.

(51) Int. Cl.
| | |
|---|---|
| *E21B 17/00* | (2006.01) |
| *E21B 17/16* | (2006.01) |
| *E21B 47/09* | (2012.01) |
| *E21B 47/13* | (2012.01) |

(Continued)

(52) U.S. Cl.
CPC .............. *G01V 3/30* (2013.01); *E21B 17/003* (2013.01); *E21B 17/16* (2013.01); *E21B 47/09* (2013.01);
(Continued)

(58) Field of Classification Search
CPC ........ E21B 17/003; E21B 17/16; E21B 47/09; E21B 47/13; G01V 3/30
See application file for complete search history.

(56) References Cited

U.S. PATENT DOCUMENTS 5,530,358 A * 6/1996 Wisler ...................... G01V 3/30
343/788
9,354,347 B2 * 5/2016 Reiderman .............. G01V 3/20
(Continued)

FOREIGN PATENT DOCUMENTS

| WO | 2017039592 A1 | 3/2017 |
|---|---|---|
| WO | 2018125207 A1 | 7/2018 |
| WO | 2018236352 A1 | 12/2018 |

*Primary Examiner* — Matthew R Buck
(74) *Attorney, Agent, or Firm* — Benjamin Ford; Parker Justiss, P.C.

(57) ABSTRACT

This disclosure presents an apparatus and system for lowering the cost of implementing a downhole sensor system using attachable collars. In some aspects, the attachable collar includes a transmitter component, while supporting electronics are included with a main collar, thereby reducing the cost of the attachable collar. The supporting electronics can send a transmission signal, a control signal, a synchronization clock signal, a selected transmission frequency, a sensor orientation and selection, and other instructions to the transmitter in the attachable collar. The receiver in the main collar can receive the output, as reflected by the subterranean formation, and transform the output to subterranean formation evaluation measurements. The measurements can be communicated to other systems. In some aspects, the attachable collar can include the receiver and the main collar can include the transmitter. In some aspects, additional attachable collars can be included on the drill string to increase the transmitter-receiver spacing.

28 Claims, 5 Drawing Sheets

(51) Int. Cl.
*G01V 3/30* (2006.01)
*G01V 3/34* (2006.01)
*E21B 49/00* (2006.01)
*G01V 3/38* (2006.01)
 E21B 47/01 (2012.01)
 G01V 3/20 (2006.01)

(52) U.S. Cl.
CPC .............. *E21B 47/13* (2020.05); *E21B 49/00* (2013.01); *G01V 3/34* (2013.01); *G01V 3/38* (2013.01); *E21B 47/01* (2013.01); *G01V 3/20* (2013.01)

(56) References Cited

U.S. PATENT DOCUMENTS

| | | | | |
|---|---|---|---|---|
| 2008/0074336 | A1* | 3/2008 | Signorelli | H01Q 25/00 343/719 |
| 2009/0302851 | A1* | 12/2009 | Bittar | E21B 47/026 324/338 |
| 2014/0292341 | A1* | 10/2014 | Yang | G01V 3/28 324/339 |
| 2015/0106016 | A1* | 4/2015 | Wu | G01V 3/30 702/6 |
| 2015/0285061 | A1* | 10/2015 | Wu | G01V 3/26 340/854.6 |
| 2015/0330190 | A1* | 11/2015 | Wu | E21B 47/12 703/6 |
| 2016/0230546 | A1* | 8/2016 | Braisher | E21B 47/13 |
| 2017/0102478 | A1* | 4/2017 | Yang | E21B 47/13 |
| 2018/0210107 | A1* | 7/2018 | Donderici | E21B 47/26 |

\* cited by examiner

MINIMAL ELECTRONIC SENSOR COLLARS

CROSS-REFERENCE TO RELATED APPLICATION

This application claims the benefit of U.S. Provisional Application Ser. No. 63/022,058, filed by Matthew Chase Griffing, et al. on May 8, 2020, entitled "ADD-ON SENSOR COLLARS WITHOUT ELECTRONICS," commonly assigned with this application and incorporated herein by reference in its entirety.

TECHNICAL FIELD

This application is directed, in general, to utilizing a sensor collar within a borehole and, more specifically, to utilizing one or more additional sensor collars.

BACKGROUND

When drilling a borehole, it may be beneficial to collect subterranean formation measurements, such as with a logging while drilling system. Collecting these measurements can be performed by various types of downhole sensors located proximate the drilling system or bottom hole assembly. A way to lower the cost of implementing the downhole sensors would be beneficial to lowering the overall costs of developing the well site.

SUMMARY

In one aspect, an apparatus is disclosed. In one embodiment, the apparatus includes (1) a first collar operable to include a first portion of an electromagnetic system, and wherein the first collar is mechanically and communicatively coupled to a drill string utilized during drilling operations in a borehole of a well site, (2) a second collar operable to include a second portion of the electromagnetic system, wherein the second collar is communicatively coupled to the first collar and mechanically coupled to one of the drill string, the first collar, a spacer, a third collar, or a drill string component, and wherein the electromagnetic system is utilized to collect one or more measurements at a location within the borehole, (3) an electromagnetic electronics system, operable to direct operations of the electromagnetic system, collect the one or more measurements, and communicate with other systems, wherein the electromagnetic electronics system is included with the first collar or the second collar, and (4) wherein the first portion of the electromagnetic system is at least one receiver to detect an electromagnetic energy or at least one transmitter to transmit the electromagnetic energy, and the second portion of the electromagnetic system is at least one of the other of the receiver or the transmitter.

In another aspect, a system to collect one or more measurements within a borehole of a well site is disclosed. In one embodiment, the system includes (1) a main collar, capable of supporting a first portion of an electromagnetic system, and coupled to a drill string, (2) an attachable collar, capable of supporting a second portion of the electromagnetic system, and coupled to one of the drill string, the main collar, a spacer, a drill string component, or a second attachable collar, and (3) an electromagnetic controller, capable of directing operation of the electromagnetic system and collecting the one or more measurements, wherein the one or more measurements are obtained utilizing the first portion of the electromagnetic system and the second portion of the electromagnetic system, and the electromagnetic controller is located with one of the main collar or the attachable collar, and wherein the first portion is at least one of a transmitter or at least one of a receiver, and the second portion is at least one of the other of the transmitter or the receiver.

In another aspect, a method is disclosed. In one embodiment, the method includes (1) assembling a bottom hole assembly (BHA) for a drill string to be utilized within a borehole of a well site, wherein the BHA includes a main collar and at least one attachable collar, (2) operating the BHA within the borehole, (3) directing sensor electronics of a sensor to initiate a transmission from at least one transmitter utilizing control signals, (4) receiving the transmission as reflected by a subterranean formation proximate the borehole, wherein the transmission is transformed into a measurement, and (5) communicating the measurement to at least one system of the well site, wherein the at least one attachable collar includes at least one of a transmitter or a receiver of the sensor and the main collar includes the sensor electronics and the other of the at least one of the transmitter and the receiver.

BRIEF DESCRIPTION

Reference is now made to the following descriptions taken in conjunction with the accompanying drawings, in which.

DETAILED DESCRIPTION

It is beneficial to take measurements of subterranean formation characteristics while drilling operations of a borehole are taking place, such as at a well site. The measurements can be utilized as inputs into other processes and systems enabling users, well site controllers, or other computing systems to adjust well site operation plans. The measurements can be derived or computed from received signals, such as from transmitted signals reflected by the subterranean formation. Various types of sensors can be utilized for this purpose, such as resistivity imaging, acoustic imaging, electromagnetic imaging, gamma imaging, and other types of sensors.

Typically, a sensor can release a signal through a transmitter, for example, sending out an acoustic wave, an electromagnetic wave, injecting or inducing electrical current into the subterranean formation, or using other methods. The released energy is reflected differently by various components of the subterranean formation and detected by a receiver. The received signal can then be transformed into a measurement of a subterranean formation characteristic and used to calculate a result or subterranean formation parameter that can be utilized by other systems, such as a geo-steering system or a well site controller.

The placement of the sensor's transmitter and receiver can impact the fidelity of the measurements, as well as the cost of operating the well site. Typically, the transmitter and receiver are located proximate the downhole tools, such as a bottom hole assembly (BHA). In some aspects, one portion of the sensor, for example, the receiver or the transmitter, can be located as part of a main collar attached to a drill string. In some aspects, the sensor electronics, e.g., electromagnetic electronic system, can be located as part of the main collar as well. The main collar is typically attached to the drill string uphole from the drilling bit assembly. In some aspects, an attachable collar can be attached uphole from the main collar and can include the other portion of the sensor, for example, the other of the receiver or the transmitter. In some aspects, the attachable collar can be attached downhole from the main collar and can include the other portion of the sensor.

This disclosure presents a sensor system where a first collar includes sensor or electromagnetic electronics, and a second collar that does not include the sensor or electromagnetic electronics, or includes minimal electronics, thereby reducing the cost of the respective first collar or second collar, and reducing the cost of operating the system. In some aspects, the second collar can include minimal electronics, such as to process control signals. In some aspects, the first collar can be the main collar and the second collar can be one of the attachable collars. In other aspects, the first collar can be one of the attachable collars, and the second collar can be the main collar or another attachable collar. In some aspects, the attachable collar can receive control signals or receive a transmitter signal from the main collar, where the electromagnetic electronics system is located, and transmit a signal per the control signals or transmitter signal. In some aspects, the attachable collar can include the receiver and the main collar can include the transmitter.

In some aspects, there can be one or more additional attachable collars thereby allowing the electromagnetic electronics system to select which attachable collar transmitter to activate. The main collar and the one or more attachable collars, e.g., a set of attachable collars, can be a set of collars, such as a collar apparatus. The multiple attachable collars can allow users of the system to select the transmitter-receiver spacing (T-R spacing), the frequency to use, the amount of power to transmit or release, and a sensor orientation. The T-R spacing, frequency, and power parameters can be used to control the depth into the subterranean formation that can be measured and the fidelity of the measurements as received from the received signals. Different types of subterranean formations can benefit from being able to select or determine a T-R spacing that best fits the characteristics of that subterranean formation.

Sensor orientation can specify a combination of a transmitter and one or more receivers, the transmitter and receivers to use that are at a specified angle to relative to the drill string orientation, and the location of the transmitter and receivers. For example, if there are more than one transmitter or receiver in the set of collars, whether main or attachable, than the sensor orientation can specify which transmitter to utilize and which one or more receivers to utilize for each sensor reading. In some aspects, if more than one transmitter is included with a collar, than each transmitter is positioned at a different transmission angle from the other transmitters included with the collar. In some aspects, if more than one receiver is included with a collar, than each receiver is positioned at a different detection angle from the other receivers included with the collar. Other iterations or executions of the sensor can utilize a different combination of the transmitters and receivers. Another example, is specifying the use of a transmitter at a 45° (degrees) angle, and two receivers, one at 90° and a second at a different angle. Other angles can be utilized. Another example is that receivers can be specified that are separated from each other or the transmitter by one or more collars, spacers, or other drill string components.

The transmitter can be one or more of a magnetic coil antenna, an electrical dipole antenna, an electrode, a toroid, an imaging button, or other transmitter type. The collar that includes the electromagnetic electronics can also include the transceiver components utilized to allow the sensor to communicate with other systems, for example, providing collected measurements to other systems. Separating the sensor components between more than one collar can enable advanced measurements with a greater T-R spacing. The disclosed apparatus can allow the construction of a low cost attachable collar, which is added to a drill string assembly, while enabling the ability to collect advanced measurements, since the attachable collar includes one portion of the sensor system, such as the transmitter or receiver, and does not include the electromagnetic electronics or a sidewall readout port.

Physical connections, such as connectors, or wireless connections, such as transformers, can be used to pass antenna transmitter or receiver signals, power, clock signals, synchronization clock signals, or other control signals from the main collar to the attachable collar, or in the reverse direction. This can provide for flexible spacing between antennas while allowing for simpler maintenance of the set of collars.

Figure 1:
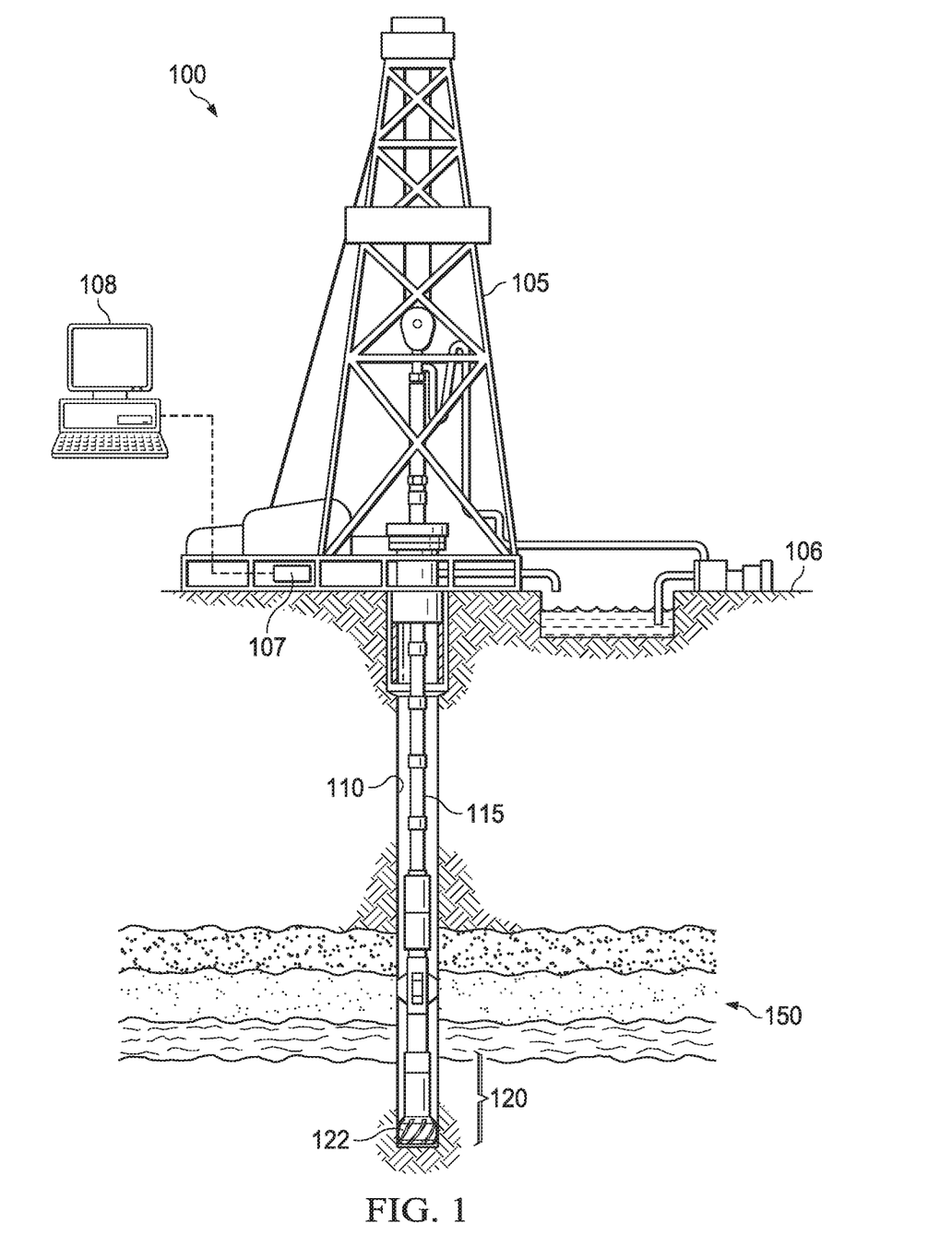
FIG. 1 is an illustration of a diagram of an example well system.

Turning now to the figures, FIG. 1 is an illustration of a diagram of an example well system 100 with a collar apparatus used to collect subterranean formation measurements, for example, a drilling system, a logging while drilling (LWD) system, a measuring while drilling (MWD) system, a seismic while drilling (SWD) system, a telemetry while drilling (TWD) system, a wireline system, and other hydrocarbon well systems. Well system 100 includes a derrick 105, a well site controller 107, and a computing system 108. Well site controller 107 includes a processor and a memory and is configured to direct operation of well system 100. Derrick 105 is located at a surface 106.

Extending below derrick 105 is a borehole 110 with downhole tools 120 at the end of a drill string 115. Downhole tools 120 can include various downhole tools and BHA, such as a drilling bit 122. Other components of downhole tools 120 can be present, such as a main collar, one or more attachable collars, a local power supply (e.g., generators, batteries, or capacitors), telemetry systems, sensors, transceivers, and control systems. Borehole 110 is surrounded by subterranean formation 150.

Well site controller 107 or computing system 108 which can be communicatively coupled to well site controller 107, can be utilized to communicate with downhole tools 120, such as sending and receiving telemetry, data, instructions, subterranean formation measurements, and other information. Computing system 108 can be proximate well site controller 107 or be a distance away, such as in a cloud environment, a data center, a lab, or a corporate office. Computing system 108 can be a laptop, smartphone, PDA, server, desktop computer, cloud computing system, other computing systems, or a combination thereof, that are operable to perform the processes described herein. Well site operators, engineers, and other personnel can send and receive data, instructions, measurements, and other information by various conventional means, now known or later developed, with computing system 108 or well site controller 107.

Well site controller 107 or computing system 108 can communicate with downhole tools 120 using conventional means, now known or later developed, to direct operations and receive the measurements from the sensors included with the main and attachable collars. For example, in some aspects, the main collar can collect the measurements and transmit the calculated results to well site controller 107 or computing system 108. In some aspects, the measurements taken, e.g., the original collected data, by the sensor electronics in the main collar can be communicated to well site controller 107 or computing system 108 and the results generated in one or more of those respective systems.

In some aspects, there can be more than one attachable collar in downhole tools 120. In some aspects, the sensor electronics can use control signals to indicate a synchronization and frequency at which the sensor portions contained in the attachable collars operate, and to indicate which of the attachable collars to utilize at the sensor logging time. In some aspects, the sensor electronics can send or receive the sensor signals directly from the sensor portions contained in the attachable collars. In this aspect, the received direct sensor signal can initiate actions. For example, a receiver can collect measurements and communicate the measurements when the transmitter sensor signal (as modified by the environment) is detected.

FIG. 1 depicts an onshore operation. Those skilled in the art will understand that the disclosure is equally well suited for use in offshore operations. FIG. 1 depicts a specific borehole configurations, those skilled in the art will understand that the disclosure is equally well suited for use in boreholes having other orientations including vertical boreholes, horizontal boreholes, slanted boreholes, multilateral boreholes, and other borehole types.

Figure 2A:
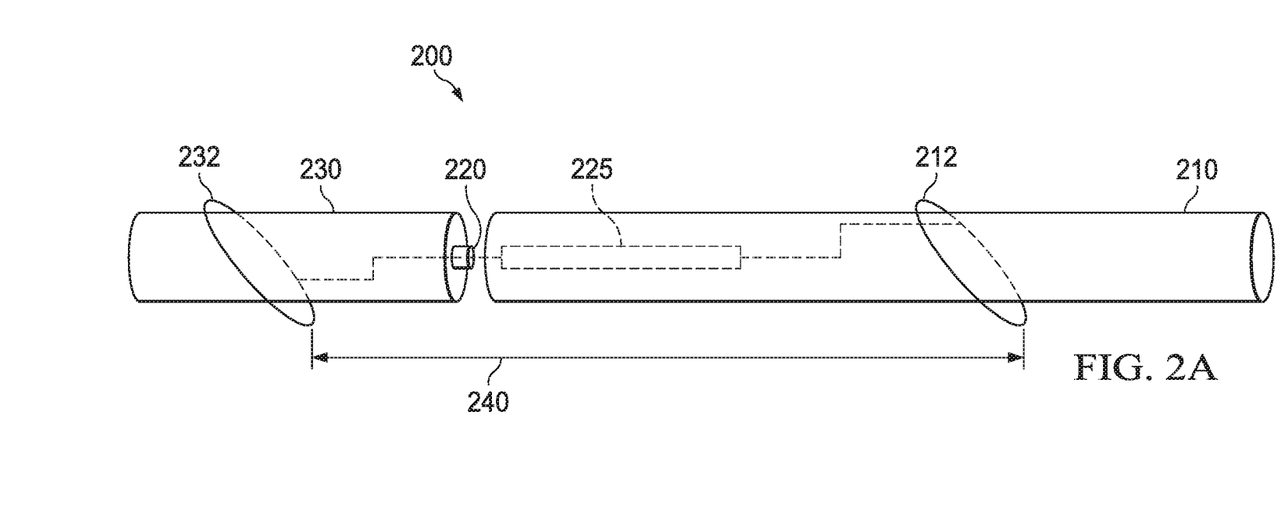
FIG. 2A is an illustration of a diagram of an example collar apparatus.

FIG. 2A is an illustration of a diagram of an example collar apparatus 200 which can be part of a BHA. Collar apparatus 200 can include one or more sensor types to be used to collect subterranean formation measurements to generate subterranean formation characteristic results. Collar apparatus 200 includes a main collar 210 and an attachable collar 230. Main collar 210 is part of the BHA and mechanically coupled to the drill string which can be inserted into a borehole of a well site.

In some aspects, main collar 210 includes a receiver portion 212 of a sensor, e.g., an electromagnetic system. An electromagnetic system can be a transceiver system or a sensor system, for example, an induction tool, a propagation resistivity tool, a resistivity imaging tool, a magnetic ranging tool, or an oil-based mud imaging tool. In some aspects, main collar 210 can include a transmitter portion of the electromagnetic system. In this example, main collar 210 includes an electromagnetic electronics system 225. In some aspects, electromagnetic electronics system 225 can be include with attachable collar 230. The electromagnetic electronics can include a communications system to allow the sensor electromagnetic electronics to communicate with other systems, such as receiving instructions from a controller or sending collected sensor measurements. For example, a reciprocity theorem indicates that in some aspects, the transmitter coil in attachable collar 230 can be a receiver coil whereas the receiver coil in the main collar 210 can be a transmitter coil. The main collar can be a conventional drill string collar and can be various lengths, for example, five to fifteen feet long, with thirty feet being a typical maximum as that is the length of a section of conventional drill pipe.

Attachable collar 230 can be various lengths, for example two to ten feet long, with thirty feet being a typical limit as that is the conventional length of a section of drill pipe. In some aspects, attachable collar 230 includes a transmitter portion 232 of the electromagnetic system. In some aspects, attachable collar 230 can include a receiver portion of the electromagnetic system. In some aspects, attachable collar 230 is mechanically coupled to the drill string and communicatively coupled to main collar 210. In some aspects, attachable collar 230 is mechanically coupled to main collar 210. The communications utilize a wired or wireless communication system. In this example, attachable collar 230 uses a connector 220 to couple mechanically and electrically with main collar 210. In some aspects, connector 220 need not be present when attachable collar 230 is coupled elsewhere on the drill string or when energy is transmitted to attachable collar 230 using other means, such as a battery or drawn from a wired drill pipe.

T-R spacing 240 indicates a distance between transmitter portion 232 and receiver portion 212. A larger distance can increase the depth into the subterranean formation the sensor can collect measurements, though at a reduced fidelity. A shorter distance can increase the measurement fidelity, though decreasing the depth into the subterranean formation from which measurements can be collected.

Figure 2B:
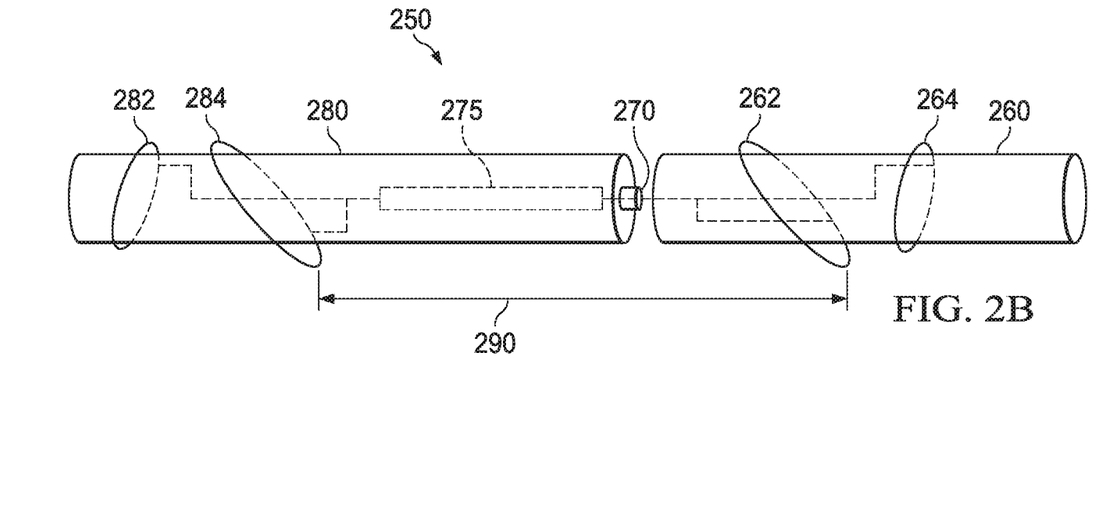
FIG. 2B is an illustration of a diagram of an example alternate collar apparatus.

FIG. 2B is an illustration of a diagram of an example alternate collar apparatus 250 which demonstrates alternative aspects. Alternate collar apparatus 250 includes a main collar 260 attached to an attachable collar 280 through a connector 270. In some aspects, an electromagnetic electronics system 275 can be part of attachable collar 280 and not part of main collar 260. If there are more than one attachable collars, then electromagnetic electronics system 275 can be part of one attachable collar and the remaining attachable collars would not include electromagnetic electronics system 275.

In some aspects, a loop antenna, such as loop antenna 262, loop antenna 264, loop antenna 282, or loop antenna 284 can be a transmitter portion or a receiver portion. There should be at least one transmitter portion in a first collar, and at least one receiver portion in a second collar, where the first collar is one of main collar 260 or attachable collar 280, and the second collar is the other of main collar 260 or attachable collar 280. In some aspects, the loop antennas can be included in the collars in various combinations, for example, there can be at least one transmitter portion and at least one receiver portion in the first collar and at least one receiver portion in the second collar. In some aspects, there can be at least one transmitter portion and at least one receiver portion in the first collar and at least one transmitter portion in the second collar.

In some aspects, loop antenna 262 or loop antenna 264 can be oriented at various angles relative to main collar 260. In some aspects, loop antenna 282 or loop antenna 284 can be oriented at various angles relative to attachable collar 280. In some aspects, there can be more than one transmitter portion, receiver portion, or combination thereof, in main collar 260 or attachable collar 280. T-R spacing 290 can vary depending on the combination of transmitter portions and receiver portions activated by electromagnetic electronics system 275, which can provide greater flexibility on collecting advanced measurements from the subterranean formation.

Figure 3:
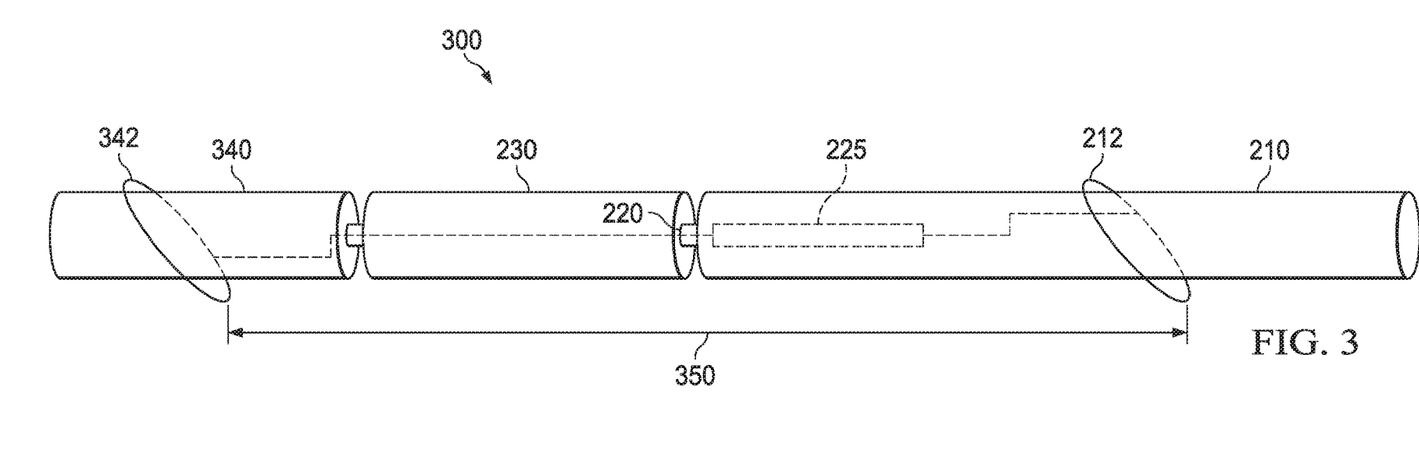
FIG. 3 is an illustration of a diagram of an example multi-collar apparatus.

FIG. 3 is an illustration of a diagram of an example multi-collar apparatus 300 that builds on FIG. 2A. Multi-collar apparatus 300 includes an additional attachable collar 340 with a transmitter portion 342. T-R spacing 350 between transmitter portion 342 and receiver portion 212 is larger as compared to T-R spacing 240. This can allow a deeper measurement collection from the surrounding subterranean formation.

In some aspects, additional attachable collars can be added to multi-collar apparatus 300. In some aspects, other components, such as spacers or other drill string components, can be added between the additional attachable collars and the main collar, or between the main collar and attachable collar 230 or attachable collar 340. Electromagnetic electronics system 225 can select, using control signals, which transmitter, such as transmitter portion 232 or transmitter portion 342, to utilize for an operation of the electromagnetic system sensors. In some aspects, as described in FIG. 2A, the transmitter portion 342 can be part of main collar 210 and receiver portion 212 can be part of attachable collar 340. For example, a reciprocity theorem indicates that in some aspects, the transmitter coil in attachable collar 340 can be a receiver coil whereas the receiver coil in the main collar 210 can be a transmitter coil, e.g., electromagnetic system sensors.

Figure 4:
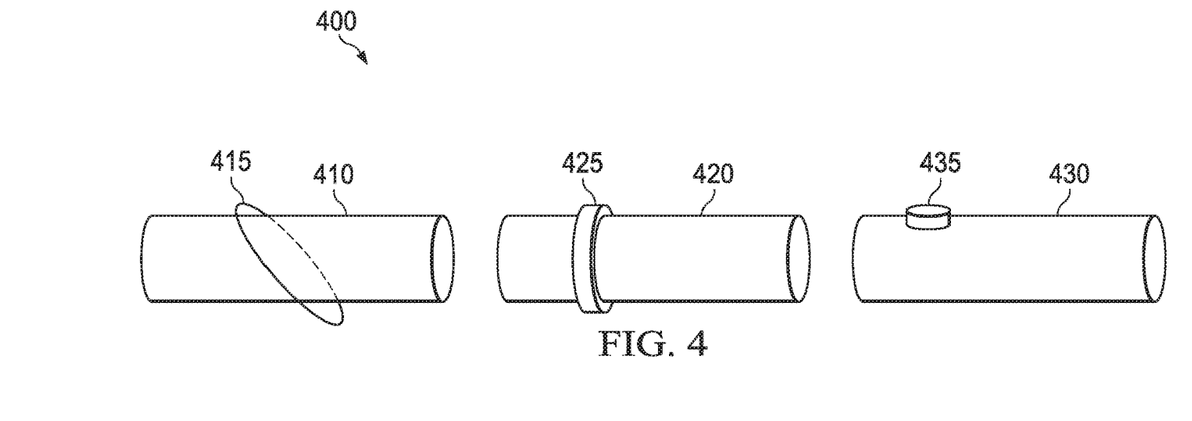
FIG. 4 is an illustration of a diagram of example sensors that can be used with the collar apparatus.

FIG. 4 is an illustration of a diagram of example sensors 400 that can be used with the collar apparatus in the main or attachable collar. Attachable collar 410 is demonstrating the implementation of a loop antenna 415. Attachable collar 420 is demonstrating the implementation of sensor 425, such as a ring electrode or toroid. Attachable collar 430 is demonstrating the implementation of an imaging button 435.

Other sensor types can be utilized as well. The receiver portion of the electromagnetic system should be of a type capable to receive the transmission from the utilized transmitter. In this example, attachable collar 410, attachable collar 420, and attachable collar 430 are shown with a transmitter portion. In some aspects, attachable collars can include the receiver portion and the main collar can include the transmitter portion.

Figure 5:
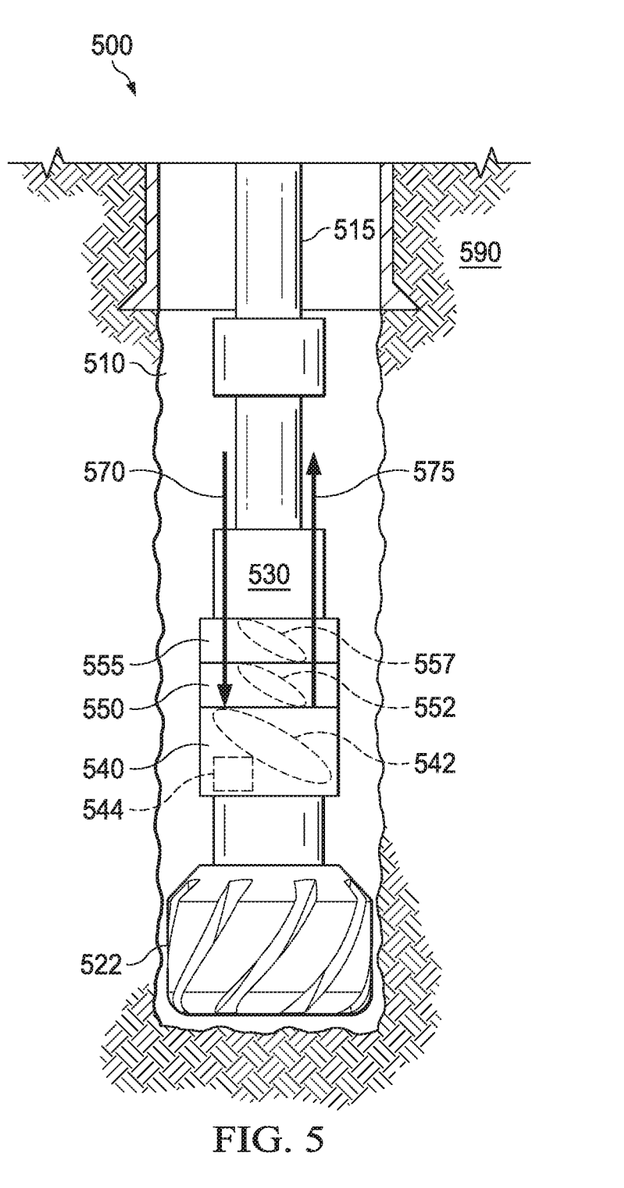
FIG. 5 is an illustration of a diagram of an example bottom hole assembly including a collar apparatus.

FIG. 5 is an illustration of a diagram of an example BHA 500 including a collar apparatus located at a downhole location within a borehole 510. Borehole 510 is located in a subterranean formation 590. Subterranean formation 590 can be heterogeneous or homogeneous formation types. Borehole 510 can be borehole 110 of FIG. 1.

Inserted into borehole 510 is a drill string 515. A traditional isolation sub 530 can be located on drill string 515. Traditional isolation sub 530 can provide electrical isolation for the lower attached components. A main collar 540, a first attachable collar 550, and a second attachable collar 555 can be located below traditional isolation sub 530. At the end of drill string 515 is a drill bit assembly 522. Other tools, devices, power supplies, and transceivers can be located on, in, or around drill string 515.

In this example, main collar 540 includes a receiver portion 542 and an electromagnetic electronics system 544. There are two attachable collars, first attachable collar 550 with a transmitter portion 552 and second attachable collar 555 with a transmitter portion 557. In some aspects, fewer or additional attachable collars can be utilized. In some aspects, there can be a spacer or other components between main collar 540 and first attachable collar 550 or second attachable collar 555.

Per instructions, such as instructions received through downhole communications 570, electromagnetic electronics system 544 can utilize control signals to specify which of the attachable collars to use for an operation and which sensor portion if the attachable collar has more than one (such as two transmitters that are at differing angles), e.g., sensor orientation, what frequency to use, the power to transmit (for example, electrical current), and the synchronization of operations. Transmitter portion 552 or transmitter portion 557 can send out a signal, for example, injecting or inducing electricity into the subterranean formation, transmitting an energy at a specified wavelength, or performing another operation per the sensor type used. In some aspects, receiver portion 542 can detect the signals, for example, reflected from a portion of the subterranean formation. In some aspects, the detected signals can be communicated to other systems, such as using uphole communications 575. In some aspects, the detected signals can be transformed into one or more collected measurements by electromagnetic electronics system 544 and then communicated to other systems.

In some aspects, downhole communications 570 or uphole communications 575 can communicatively couple electromagnetic electronics system 544 with other tools or systems in BHA 500, for example, a geo-steering system. In some aspects, downhole communications 570 or uphole communications 575 can communicatively couple electromagnetic electronics system 544 with other tools or systems elsewhere in the borehole or well site, such as a well site controller or computing system. For example, instructions, input parameters, and other information can be communicated from a well site controller located at a surface of the well site to electromagnetic electronics system 544 using downhole communications 570. Downhole communication 570 and uphole communication 575 can be performed by conventional means now known or later developed, for example, mud pulse, wired drill pipe, acoustic, fiber optic cable, wireless methods, or other communication types and standards.

Figure 6:
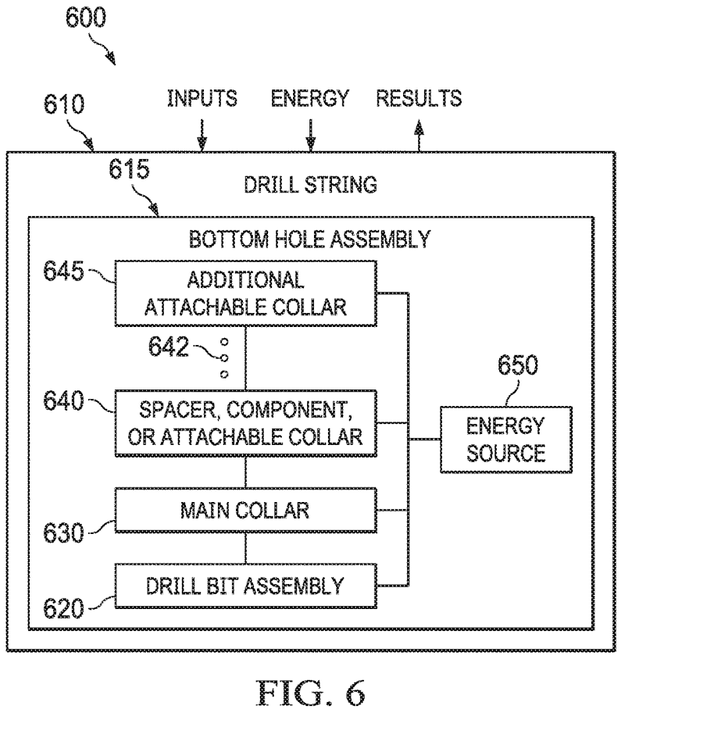
FIG. 6 is an illustration of a block diagram of an example collar system.

FIG. 6 is an illustration of a block diagram of an example collar system 600, such as shown as BHA 500. Collar system 600 includes a drill string 610. At a downhole end of drill string 610 is a BHA 615. In some aspects, BHA 615 can be replaced with other types of drilling assemblies or wireline tools. BHA 615 includes a drill bit assembly 620, a main collar 630, and at least one attachable collar 640. In some aspects, attachable collar 640 can be replaced by a spacer or other downhole tool component. There can be zero or more additional attachable collars 645. Components 642 indicate that there can be attachable collars, spacers, or other downhole tool components, in various combinations, between main collar 630 and the furthest additional attachable collar 645. In the disclosed examples, main collar 630 is depicted as being located closest to drill bit assembly 620 as compared to the one or more attachable collars. In some aspects, the one or more attachable collars can be located closer to drill bit assembly 620 and main collar 630 can be located further away.

Inputs can be received by an electromagnetic controller, for example, from a well site controller, computing system, or BHA controller, indicating a time to perform the operations, a frequency to utilize, the amount of power to transmit, sensor orientation and selection, and other input parameters. The electromagnetic controller can be located with main collar 630, attachable collar 640, or additional attachable collar 645. The electromagnetic controller can direct operation of the sensor, e.g., transceiver, portions in each of main collar 630, attachable collar 640, and additional attachable collar 645. The electromagnetic controller can be an electromagnetic electronics system.

Energy can be received from one or more sources to provide power to main collar 630 components, attachable collar 640, components included in components 642, and additional attachable collar 645. For example, energy can be supplied from a downhole energy source 650, such as a battery, generator, or capacitor, or energy can be supplied from an uphole energy source, such as through a powered drill pipe, electrical cable, or other transmission means. Main collar 630, attachable collar 640, components included in components 642, or additional attachable collar 645 can include their own respective energy sources, such as one or more batteries. In some aspects, energy can be sourced from more than one source, in various combinations.

Received data, measurements, or results can be communicated utilizing a measurement processor to other systems, for example, a BHA controller, a geo-steering system, a well site controller, or other computing system. In some aspects, the results can include diagnostic data on the performance or calibration of the sensors included with main collar 630, attachable collar 640, components included in components 642, or additional attachable collar 645.

Figure 7:
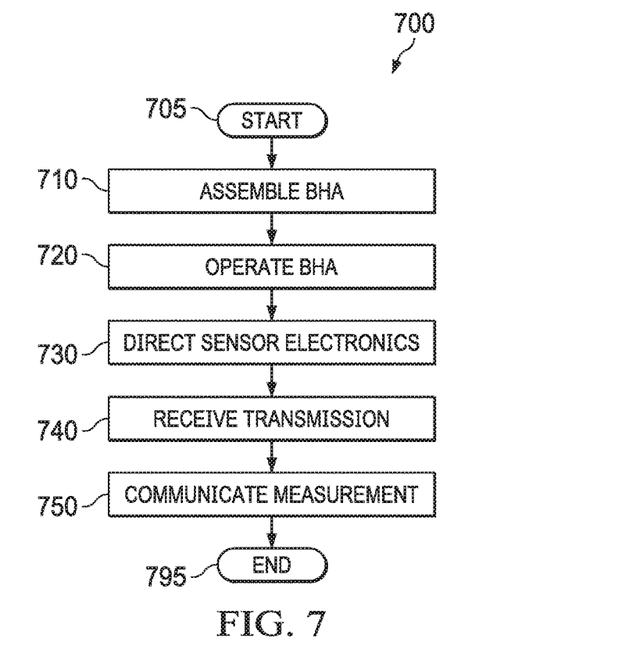
FIG. 7 is an illustration of a flow diagram of an example method using low cost attachable collars.

FIG. 7 is an illustration of a flow diagram of an example method 700 using low cost attachable collars, where the attachable collars can be the collars as described in FIG. 2A attachable collar 230 or FIG. 3 attachable collar 340. Method 700 demonstrates one aspect of use where the BHA can be assembled at a surface location with the appropriate combination and T-R spacing between the main collar and the one or more attachable collars. The appropriate combination can vary with the varying conditions and characteristics of various subterranean formations. In some aspects, the drill string can be pulled back up and the BHA reconfigured with a different combination of main collar, attachable collars, and spacers as subterranean formation characteristics change over the course of a drilling operation.

Method 700 starts at a step 705 and proceeds to a step 710. In step 710, the BHA can be assembled using a main collar and one or more attachable collars. The T-R spacing between the main collar and each of the attachable collars can vary and can be dependent on the type of advanced sensor measurements that will be desired to be collected. In some aspects, there can be zero or more spacers or other components separating the main collar and the one or more attachable collars, or separating one attachable collar from another attachable collar. The attachable collars can include a transmitter portion of the sensor system or the receiver portion of the sensor system. In some aspects, the attachable collars can include a local energy source, such as batteries. In some aspects, the attachable collars do not include other sensor electronics or other electronics. In some aspects, the attachable collars can include minimal electronics, such as to process control signals. These aspects can help reduce the cost of the attachable collars.

In a step 720, the BHA can be lowered into a borehole and conventional operations can be performed. Proceeding to a step 730, the system can direct the sensor electronics of a sensor, such as included with the main collar, to initiate a transmission of the sensor. Control signals can be used to provide the information, such as a synchronization, frequency, power level, and an indicator for which specified attachable collar to utilize, if more than one is present. The control signals can be communicated using a wired or wireless method. For example, an electrical signal of the specified power can be induced into the subterranean formation at the specified time. In some aspects, the control signal can be replaced by a direct sensor signal, where the receiver of the direct sensor signal does not include minimal electronics.

Proceeding to a step 740, the transmitted sensor signal, as reflected or bounced from, or modified by, the subterranean formation, can be received by a receiver portion of the sensor system. For example, the main collar can include a receiver portion of the sensor system and therefore receive the transmission as modified by the subterranean formation. In a step 750, the received transmission can be transformed into a measurement of a characteristic of the subterranean formation. In some aspects, the measurement can be used in a calculation to generate a result as well. The measurement, result, or information regarding the sensor, such as maintenance information, e.g., maintenance parameters, or calibration information, e.g., calibration parameters, can be communicated to another system, such as geo-steering system, a well site controller, or other computing system of the well site. Method 700 ends at step 795.

A portion of the above-described apparatus, systems, or methods may be embodied in or performed by various analog or digital data processors, wherein the processors are programmed or store executable programs of sequences of software instructions to perform one or more of the steps of the methods. A processor may be, for example, a programmable logic device such as a programmable array logic (PAL), a generic array logic (GAL), a field programmable gate arrays (FPGA), or another type of computer processing device (CPD). The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems, or apparatuses described herein.

Portions of disclosed examples or embodiments may relate to computer storage products with a non-transitory computer-readable medium that have program code thereon for performing various computer-implemented operations that embody a part of an apparatus, device, or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floppy disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions, and modifications may be made to the described embodiments. It is also to be understood that the terminology used herein is for the purpose of describing particular embodiments only, and is not intended to be limiting, because the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

What is claimed is:

1. An apparatus, comprising:
   a first collar operable to include a first portion of an electromagnetic system, and wherein the first collar is mechanically and communicatively coupled to a drill string utilized during drilling operations in a borehole of a well site;
   a second collar operable to include a second portion of the electromagnetic system, wherein the second collar is communicatively coupled to the first collar and mechanically coupled to one of the drill string, the first collar, a spacer, a third collar, or a drill string component, and wherein the electromagnetic system is utilized to collect one or more measurements at a location within the borehole;
   an electromagnetic electronics system, operable to direct operations of the electromagnetic system, collect the one or more measurements, and communicate with other systems, wherein the electromagnetic electronics system is included with the first collar and the second collar does not include the electromagnetic electronics system; and
   wherein the first portion of the electromagnetic system is at least one receiver to detect an electromagnetic energy or at least one transmitter to transmit the electromagnetic energy, and the second portion of the electromagnetic system is at least one of the other of the receiver or the transmitter.

2. The apparatus as recited in claim 1, wherein the second collar is an attachable collar and is mechanically coupled to the first collar, wherein the first collar is a main collar.

3. The apparatus as recited in claim 1, wherein the transmitter utilizes a magnetic coil antenna, an electrical dipole antenna, a ring electrode, a toroid, or an imaging button.

4. The apparatus as recited in claim 1, wherein the first portion of the electromagnetic system is the at least one receiver and the second portion of the electromagnetic system is the at least one transmitter.

5. The apparatus as recited in claim 1, wherein the first collar or the second collar includes the at least one transmitter and the at least one receiver.

6. The apparatus as recited in claim 5, wherein the at least one transmitter is at least two transmitters and each transmitter utilizes a different transmission angle from the other of the at least two transmitters.

7. The apparatus as recited in claim 5, wherein the at least one receiver is at least two receivers and each receiver utilizes a different detection angle from the other of the at least two receivers.

8. The apparatus as recited in claim 1, wherein the receiver utilizes a magnetic coil antenna, an electrical dipole antenna, a ring electrode, a toroid, or an imaging button.

9. The apparatus as recited in claim 1, wherein the first collar utilizes control signals with the second collar.

10. The apparatus as recited in claim 1, wherein the first collar utilizes direct sensor signals with the second collar.

11. The apparatus as recited in claim 1, wherein the electromagnetic electronics system utilizes a wireless communication system for control signals.

12. The apparatus as recited in claim 1, wherein the second collar is separated from the first collar by one or more of the drill string component, one or more of a bottom hole assembly, one or more of the spacers, or one or more of the third collars.

13. The apparatus as recited in claim 1, further comprising:
   a set of attachable collars, including one or more attachable collars, wherein at least one attachable collar in the set of attachable collars includes a portion of the electromagnetic system, and the set of attachable collars is communicatively coupled to the first collar, and mechanically coupled to the drill string.

14. The apparatus as recited in claim 1, wherein the first collar provides energy to the second collar.

15. The apparatus as recited in claim 1, wherein the second collar receives energy from a battery or a wired drill pipe.

16. The apparatus as recited in claim 1, wherein the electromagnetic electronics system utilizes a wired communication coupling, a wireless communication coupling, or a wired through drill pipe communication coupling.

17. The apparatus as recited in claim 1, wherein the electromagnetic system is operable to utilize one or more frequencies, and the electromagnetic electronics system is further capable of utilizing control signals, direct sensor signals, a frequency, a power level, and a synchronization clock signal to the first portion of the electromagnetic system and the second portion of the electromagnetic system.

18. A system to collect one or more measurements within a borehole of a well site, comprising:
   a main collar, capable of supporting a first portion of an electromagnetic system, and coupled to a drill string;
   an attachable collar, capable of supporting a second portion of the electromagnetic system, and coupled to one of the drill string, the main collar, a spacer, a drill string component, or a second attachable collar; and
   an electromagnetic controller, capable of directing operation of the electromagnetic system and collecting the one or more measurements, wherein the one or more measurements are obtained utilizing the first portion of the electromagnetic system and the second portion of the electromagnetic system, and the electromagnetic controller is located with the main collar and the attachable collar does not include the electromagnetic controller, and wherein the first portion is at least one of a transmitter or at least one of a receiver, and the second portion is at least one of the other of the transmitter or the receiver.

19. The system as recited in claim 18, further comprising:
   a measurement processor, capable of communicating the one or more measurements, a result, or a maintenance parameter to a first one or more other systems and receiving instructions and data from a second of one or more other systems.

20. The system as recited in claim 18, wherein the first portion of the electromagnetic system is the at least one of the receiver and the second portion of the electromagnetic system is the at least one of the transmitter.

21. The system as recited in claim 18, wherein the first portion of the electromagnetic system or the second portion of the electromagnetic system includes at least one of the transmitter and at least one of the receiver.

22. The system as recited in claim 18, wherein the electromagnetic system is one of an induction tool, a propagation resistivity tool, a resistivity imaging tool, a magnetic ranging tool, or an oil-based mud imaging tool.

23. The system as recited in claim 18, further comprising:
a well site controller, capable of receiving the one or more measurements.

24. The system as recited in claim 18, wherein the electromagnetic controller is further capable of adjusting a frequency used by the first portion of the electromagnetic system and the second portion of the electromagnetic system, specifying a power level for the transmitter, and selecting a subset of receivers to utilize when more than one receiver is present in the system.

25. The system as recited in claim 18 further comprising:
a set of attachable collars, wherein the attachable collar is part of the set of attachable collars, and each attachable collar in the set of attachable collars is communicatively coupled to the main collar, and wherein the electromagnetic controller can utilize a control signal or a direct sensor signal with one or more attachable collars in the set of attachable collars.

26. A method, comprising:
assembling a bottom hole assembly (BHA) for a drill string to be utilized within a borehole of a well site, wherein the BHA includes a main collar and at least one attachable collar;
operating the BHA within the borehole;
directing sensor electronics of a sensor to initiate a transmission from at least one transmitter;
receiving the transmission as reflected by a subterranean formation proximate the borehole, wherein the transmission is transformed into a measurement; and
communicating the measurement to at least one system of the well site, wherein the at least one attachable collar includes at least one of a transmitter or a receiver of the sensor and the main collar includes the sensor electronics and the other of at least one of the transmitter or the receiver of the sensor, and the attachable collar does not include an electromagnetic controller.

27. The method as recited in claim 26, wherein there are at least two attachable collars and the directing sensor electronics indicates a utilization of a specified attachable collar, a frequency, a power level, and a synchronization clock signal.

28. The method as recited in claim 26, wherein the directing sensor electronics utilizes a direct sensor signal.

* * * * *